United States Patent [19]

Delagi et al.

[11] B 4,016,541

[45] Apr. 5, 1977

[54] MEMORY UNIT FOR CONNECTION TO CENTRAL PROCESSOR UNIT AND INTERCONNECTING BUS

[75] Inventors: Bruce A. Delagi, Acton; Joseph Paul Zeh, Maynard; Rony Elia-Shaoul, Belmont, all of Mass.

[73] Assignee: Digital Equipment Corporation, Maynard, Mass.

[22] Filed: Apr. 17, 1974

[21] Appl. No.: 461,752

[44] Published under the second Trial Voluntary Protest Program on April 20, 1976 as document No. B 461,752.

Related U.S. Application Data

[63] Continuation of Ser. No. 295,810, Oct. 10, 1972, abandoned.

[52] U.S. Cl. .......................................... 340/172.5
[51] Int. Cl.² .......................................... G06F 3/00
[58] Field of Search ................................ 340/172.5

[56] References Cited

UNITED STATES PATENTS

| 3,810,114 | 5/1974 | Yamada et al. | 340/172.5 |
| 3,828,325 | 8/1974 | Stafford et al. | 340/172.5 |
| 3,845,425 | 10/1974 | Clements et al. | 340/172.5 |

*Primary Examiner*—Gareth D. Shaw
*Assistant Examiner*—C. J. Bartz
*Attorney, Agent, or Firm*—Cesari and McKenna

[57] ABSTRACT

In order to incorporate a very high speed memory subsystem into a computer system utilizing unified bus architecture, memory control apparatus associated with the very high speed memory is provided with a first port communicating directly with a system central processor and a second port interfacing with the unified bus. The memory control apparatus may include means for systematically refreshing volatile high speed memories. Multiple processor systems may be realized by taking advantage of the dual port characteristics of the very high speed memory subsystems associated with each central processor.

4 Claims, 4 Drawing Figures

MEMORY UNIT FOR CONNECTION TO CENTRAL PROCESSOR UNIT AND INTERCONNECTING BUS

CROSS REFERENCE TO RELATED APPLICATION

This is a continuation application of Ser. No. 295,810, filed Oct. 10, 1972, entitled UNIFIED BUS COMPUTER SYSTEM INCORPORATING VERY HIGH SPEED MEMORY (now abandoned).

BACKGROUND OF THE INVENTION

This invention relates to the data processing systems and, more particularly, to a data processing information storage and communication system for accomodating a very high speed memory.

A significant advance in computer system architecture has been the utilization of a unified bus. With unified bussing architecture, all devices, including the central processor, are connected in parallel to the bus. Any device (except memory) can dynamically request control of the bus to transfer information to another device using an approach based on real and simulated memory addresses. Thus, the central processor can look on its peripherals as if they were locations in memory with special properties and can operate on them using the same set of instructions used to operate on memory.

Devices communicate on the unified bus in a master-slave relationship. During any bus operation, one device has control of the bus. The device in control, called the master, communicates with another device called the slave. The relationship is dynamic such that, for example, the central processor as master may send control information to a disk (slave) which then could obtain the bus as a master to communicate with core memory as a slave.

The unified bus is used by the central processor and all input/output devices. A priority structure determines which device has control of the bus at any given instant of time. Therefore, every device capable of becoming bus master has an assigned priority, and when two devices request the bus at the same time, the device with the higher priority will receive control first. Communication on the unified bus is asynchronous and interlocked between devices. For each control signal issued by the master, there is a response from the slave; thus, communications is independent of physical bus length and the response time of master and slave devices.

However, even though unified bussing has been successful in increasing system generality, the advent of very high speed semiconductor memories (i.e., with access times which are less than bus transfer times) required a new approach to memory organization.

It is therefore a broad object of this invention to provide means for integrating a very high speed memory into a computer system utilizing unified bus architecture.

It is another object of this invention to provide a high speed memory subsystem which can communicate directly with a central processor unit, as a constituent thereof, and also with a bus in a unified bus computer system.

It is a more specific object of this invention to provide a high speed memory subsystem including control means for communicating within a central processor unit through a high speed dedicated bus and with other elements of the computer system as a parallel unit on a unified bus.

SUMMARY

In accordance with this invention, a memory unit has two bidirectional ports. One port connects to a bus which connects the central processor unit, other memory and peripheral units in parallel. The second port connects directly to circuits in the central processor unit for direct transfers therewith. The memory unit contains address, decoding, and control circuits for controlling memory response.

The subject matter of the invention is particularly pointed out and distinctly claimed in the concluding portion of the specification. The invention, however, both as to organization and method of operation, may best be understood by reference to the following description taken in connection with the accompanying drawings.

BRIEF DESCRIPTION OF THE DRAWINGS

FIG. 3, comprising

DESCRIPTION OF AN ILLUSTRATIVE EMBODIMENT

Figure 1:
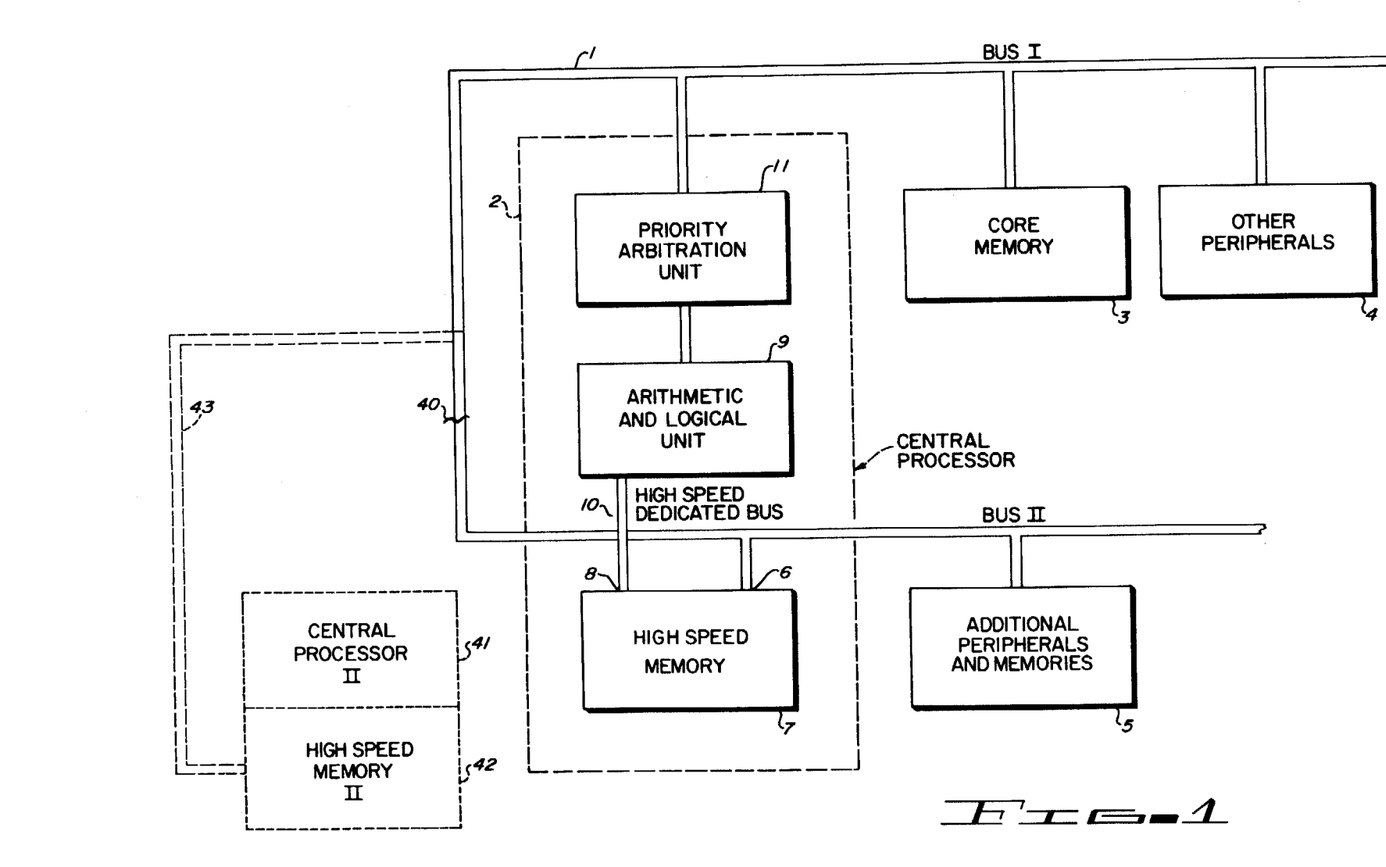
FIG. 1 is a major block diagram of a unified bus computer system employing a very high speed memory.

Attention is now directed to FIG. 1 in which it will be observed that a unified bus (i.e., BUS 1 designated by reference numeral "1") serves as a common data communications path between a central processor 2, a core memory 3, and an indeterminate number of other peripherals 4, additional peripherals and memories 5, and one port 6 of a high speed memory 7 which may be architecturally deemed a constitutent of the central processor 2. A second port 8 of the high speed memory 7 is coupled directly to the arithmetic and logical unit 9 of central processor 2 by a high speed dedicated bus 10. A priority arbitration unit 11 within the central processor 2 systematically sets up the master/slave reltionship between system devices according to a predetermined priority structure.

Figure 2:
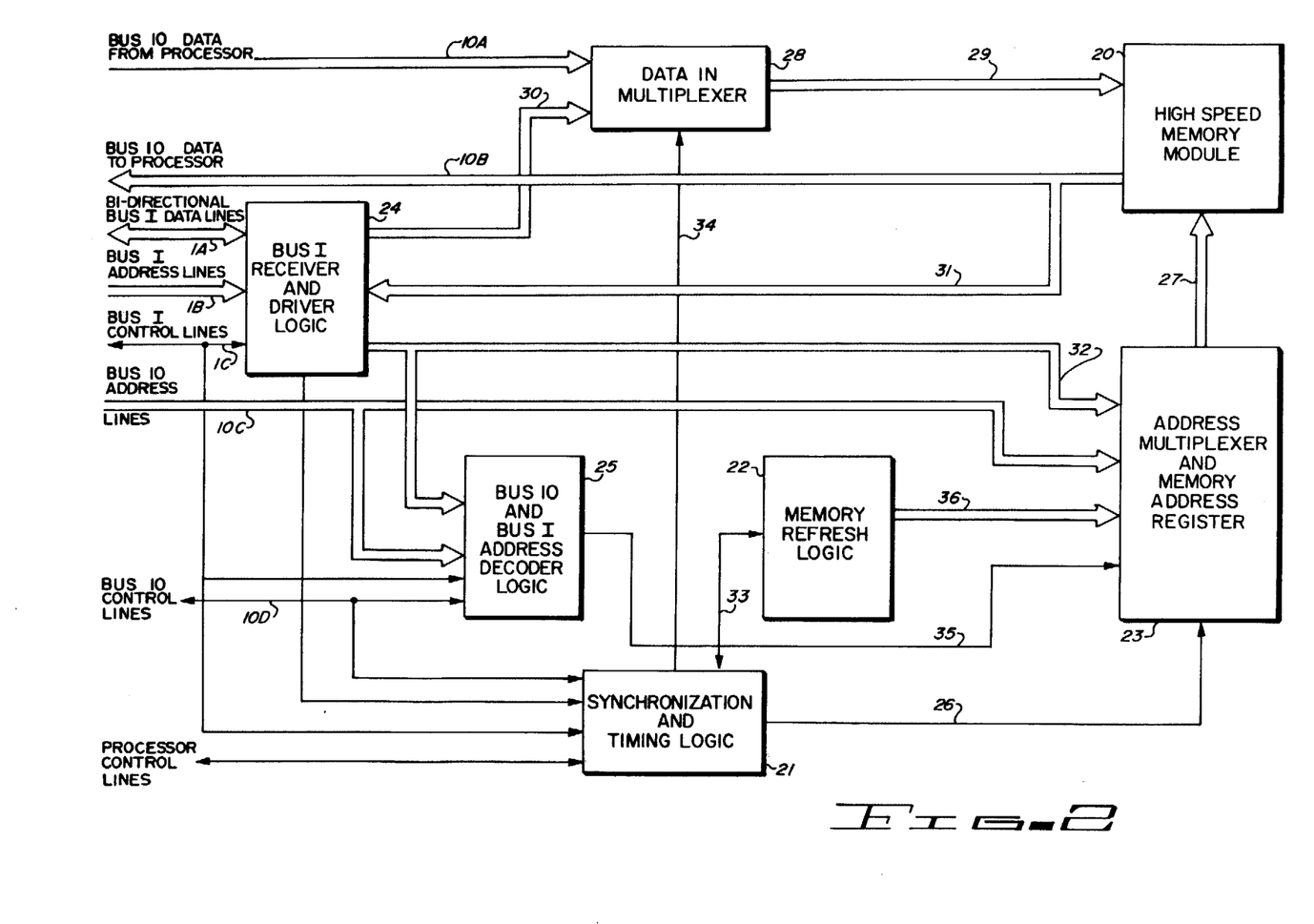
FIG. 2 is a detailed block diagram of the high speed memory subsystem illustrating the manner in which the high speed memory communicates within central processor unit by means of a high speed dedicated bus and with other subsystems of the computer system by means of a unified bus.

FIG. 2 is a detailed block diagram of the high speed memory 7 from which it may be noted that transfer of data through the memory control apparatus to and from the lines 1A, 1B, 1C of BUS 1 and lines 10A, 10B, 10C and 10D of high speed dedicated bus and the high speed memory module 20 is coordinated by the synchronization and timing logic 21. The memory control apparatus illustrated in FIG. 2 accepts and interprets control signals from the high speed dedicated bus and the BUS 1, controls communication within these buses and implements data output and data input cycles when requested. The memory refresh logic 22 is provided to periodically refresh certain types of high speed memory such as MOS (metal oxide silicon) semiconductor memories and need only be enabled if a high speed memory of this character is utilized.

From FIG. 2, it will be understood that the high speed dedicated bus 10 comprises four sections: data-in lines 10A, data-out lines 10B, address lines 10C, and control lines 10D. Similarly, BUS I comprises bidirectional data lines 1A, address lines 1B and control lines 1C. Various other control line input signals and output signals, designated processor control lines, pass between the memory control apparatus and other elements of the central processor 2 (FIG. 1) to coordinate information transfers.

Each of the circuits represented by a block diagram in FIG. 2 is well known in the art or is an obvious modification of a known circuit. Detailed schematics of these circuits are disclosed in a PDP-11/45 MS 11 Semiconductor Memory Maintenance Manual together with its related engineering drawings (hereinafter the "Maintenance Manual") published in April, 1972. However, FIG. 3 is a logic diagram which discloses, in a simplified form, a specific embodiment of typical circuits in each block diagram based upon the disclosure which appears in the "Maintenance Manual".

The high speed memory module 20 is an addressable storage means and may be addressed from BUS 10, from the BUS I, or from the memory refresh logic 22 (if necessary). An address is applied from the address lines 10C to an address multiplexer and memory address register logic block 23. An address appearing on the address lines 1B, after passing through the receiver and driver logic 24, is also applied to the address multiplexer and memory address register 23 over lines 32. The receiver and driver logic 24 is utilized since BUS I may be a relatively long line which must be driven and received in contrast to BUS 10 which may be, and usually is, a component of the processor and physically positioned proximate the apparatus with which data communication is carried out. A memory refresh address is also applied via address lines 36 directly to the address multiplexer and memory address register 23 from the memory address logic 22.

Address signals from the lines 1B and 10C are also applied to the address decoder logic 25. The address decoder logic 25 examines predetermined bits in the received address to provide an indication via control lines 35 to the address multiplexer and memory address register 23 whether the just received address falls within the high speed memory module 20 and in what section thereof. Control signals on the control lines 26 determine whether an address for BUS I, an address for BUS 10, or a refresh address is accepted into the memory address register within the logic block 23. The accepted address is applied on the memory address lines 27 to the high speed memory module 20. The character of the control signals on the lines 26 is, in turn, determined by control signals received from the control lines 10D, the control lines 1C, conditioned through the receivers and driver logic 24, the memory refresh logic 22 on the control lines 33, and the processor control signals.

Address multiplexing occurs asynchronously, based on either demand, as with isolated access request, or on priority arbitration, as in the case of several substantially simultaneous access requests. However, when the multiplexing strobe levels are asserted on the address multiplexer and memory address register 23 via the control lines 26, all priority claims have been arbitrated by the central processor. Hence, of the three classes of addresses (i.e., for the BUS I, BUS 10 or the memory refresh logic 22) which may be applied substantially simultaneously to the logic block 23, the selected next one admitted to the memory address register therein is controlled by a signal from the synchronization and timing module 21.

Assume, for purposes of illustration, that the processor wishes to read data into the high speed memory module 20 through BUS 10. The appropriate address will be issued from the central processor on the address line 10C and applied to the address multiplexer 23 as well as the address decoder logic 25 which alerts the memory address register to a specific area of the high speed memory module 20 to be affected. Control signals from the central processor indicate to the synchronization and timing logic 21 that only the address appearing on the address lines 10C is to be strobed into the memory address register by signals applied to the control lines 26. The specified memory location in the high speed memory module 20 is enabled by the memory address lines 27 from the memory address register. Data from the processor appearing on the data-in lines 10A is applied to one input of a data-in multiplexer 28. The data-in multiplexer 28 is conditioned by a signal appearing on control line 34 from synchronization and timing logic 21 to pass only data received from the data-in lines 10A to the high speed memory write bus 29. Therefore, the information (typically a data word or byte) is placed into the high speed memory module 20 at the memory location raised by the memory address bus 27.

If, on the other hand, only an address for BUS I is being impressed on the address multiplexer 23, or if priority arbitration has indicated to the synchronization and timing logic 21 that the BUS I address is to receive priority, the address on lines 1B will be strobed into the memory address register by the appropriate control line 26, and data-in multiplexer will accept only information received from the data lines 1A, conditioned in the receiver and driver logic 24 and applied to the data-in multiplexer 28 by the bus 30. Hence, the address raised on the address lines 1B will be impressed on the memory address bus 27, and the memory location so addressed will receive the information from the data lines 1A on the write bus 29.

Within an appropriate time period coordinated by the memory refresh logic 22 and the synchronization and timing logic 21, the refresh address will take precedence over either a BUS I address or a BUS 10 address and will be strobed into the memory address register by signals appearing on the control lines 26. The refresh address is a row address only such that the high speed memory module 20 responds to the information appearing on the memory address bus 27 by internally regenerating the entire specified row. In this manner, a volatile high speed memory may be refreshed on a systematic, row by row basis, as normal communication is carried out with the other buses.

If the central processor wishes to receive information from the high speed memory module 20, the address lines 10C impress the appropriate memory location on the address multiplexer and memory address register 23, and, when permitted by the synchronization and timing logic 21, the address is gated into the memory address register and into the high speed memory module 20 via the memory address bus 27. The data read from the high speed memory module 20 may be communicated directly to the processor by means of the data-out lines 10B. However, if it is BUS I requesting information from the high speed memory module 20, once the specified address is impressed on the memory address bus 27, the extracted information is placed on the data-out lines 31 which are generally in parallel with the data-out lines 10B. Information on the data-out lines 31 is converted by the bus receiver and driver logic 24 and placed on the bidirectional data lines 1A for communication with any other system module coupled to the BUS I. Hence, direct communication may be set up between the high speed memory module 20 and core memory or other peripheral devices connected to the BUS I. Similarly, it is possible for the high speed memory module 20 to communicate with the central processor by means of the BUS I rather than the BUS 10.

Referring again to FIG. 1, it may be observed that the BUS I could be broken at the point 40 to develop a BUS I and a BUS II, the latter communicating with the port 6 of the high speed memory 7. Since this port can communicate with a central processor as another parallel element on BUS II, central processor II 41 may be chained to the system. Central processor II 41 may also be provided with dual port high speed memory, and the chaining may be carried out to a very extended system incorporating processors that operate in individual environments that offer virtually no conflict or data time penalty in accessing a common data base. In a two processor system, the high speed memory II 42 may have its low-speed port coupled back to BUS I by a link 43 as shown in FIG. 1 to achieve a very powerful and fast system.

Figure 3A:
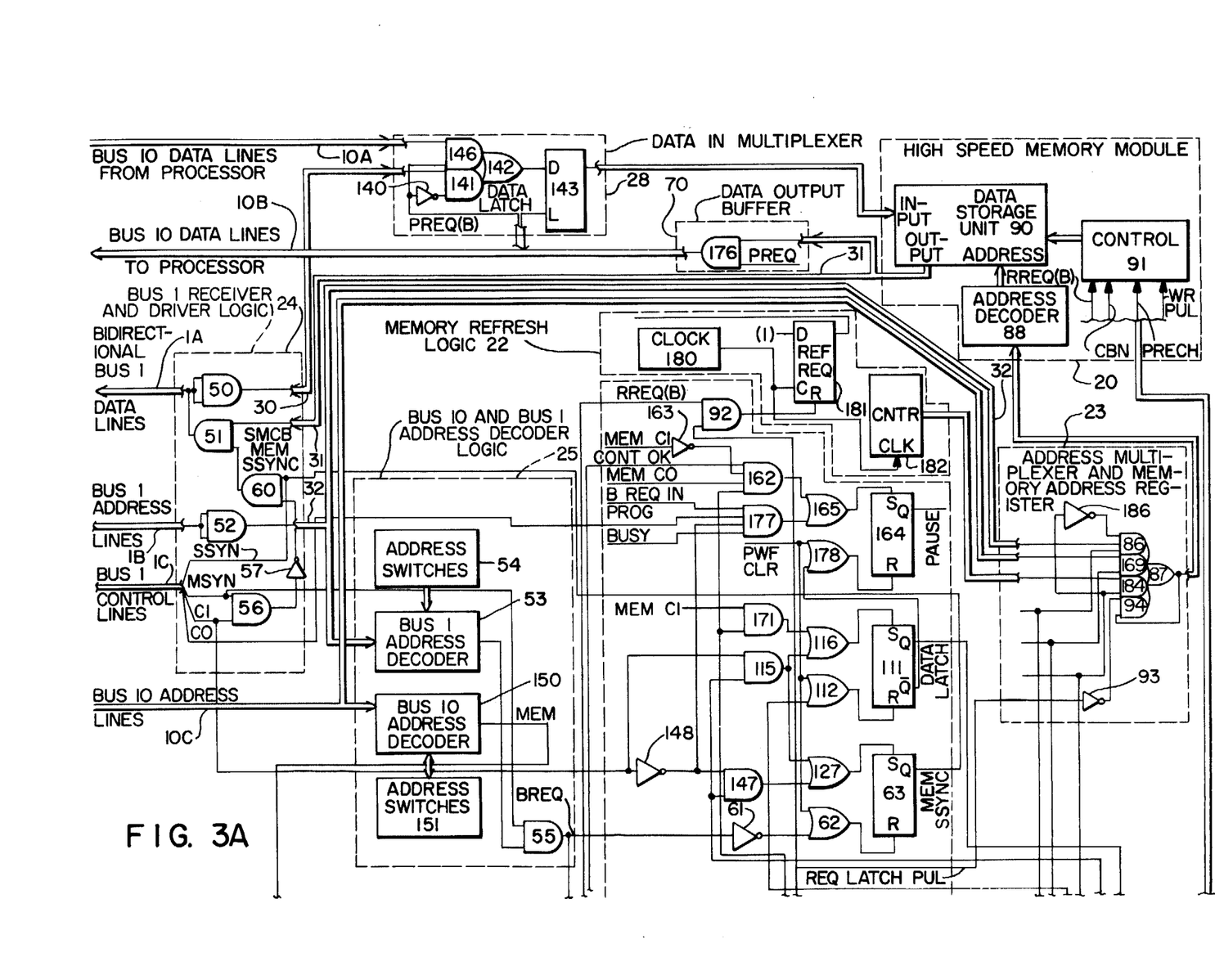
FIGS. 3A and 3B, is a simplified detailed logic diagram of one embodiment of the circuit shown in FIG. 2.

FIG. 3 shows, in detail, an example of logic circuitry which can be incorporated on each of the blocks in FIG. 2. With respect to bus data and address lines in each of BUS I and BUS 10, only gating and buffer circuits related to one such line are shown. Circuits associated with the other individual lines are identical. Thus, only one conductor from the bidirectional BUS I data lines 1A is shown in the BUS I receiver and driver logic circuit 24 in FIG. 3A for transferring signals to an AND gate 50 which serves as a data receiver during a data transfer to the memory module 20 and a gate 51 for receiving data from one line in the bus 31 for transfer to a data line 1A. Likewise, the circuit 24 in FIG. 3A is drawn in terms of one line from the BUS I address line 1B and a single AND gate 52. On the other hand, the circuits connected to the central lines 1C and 10D are shown in detail.

The circuit shown in FIGS. 2 and 3 performs five basic operations, including:

A. A data transfer from the data lines 1A for storage in the high speed memory module 20;

B. A data transfer from the high speed memory module 20 to the data lines 1A for transfer to an element in the system shown in FIG. 1;

C. A data transfer from the arithmetic and logical unit 9 (FIG. 1) over the data lines 10A for storage in the high speed memory module 20;

D. A data transfer from the high speed memory module 20 onto the data lines 10B for transfer to the arithmetic and logical unit 9 in FIG. 1; and E. A memory refreshing cycle during which a specific row in a volatile high speed memory module is refreshed to prevent any loss of data.

Each of these operations is described in detail below assuming that there are no competing requests for other types of operations. When such a competition does exist, priority circuitry in the synchronization and timing logic 21 and the address multiplexer and memory address register 23 coact to award priority to one type of request, as described later.

A. Data Transfer From BUS I to the Memory Module 20

One embodiment of a computer using unified busing architecture is described in U.S. Pat. No. 3,710,324. In accordance with that patent, a bus, such as BUS I, contains address lines, bidirectional data lines and control lines. These are shown in FIGS. 2 and 3 as, respectively, bidirectional data lines 1A, address lines 1B and control lines 1C. Typical control signals which appear on the control wires 1C include C0 and C1 signals which indicate the direction of a data transfer (i.e., whether the transfer is to retrieve data from or store data in the memory module 20), a master synchronizing signal (MSYN) which initiates a data cycle operation in the memory module 20 shown in FIGS. 2 and 3 and a slave synchronizing signal (SSYN) which indicates to a master unit that a data cycle in the memory module 20 is complete.

Now referring specifically to FIG. 3, a transfer of data from a master unit connected to BUS I to the high speed memory module 20 (i.e., a writing operation) begins when the master unit applies address signals onto the address lines 1B, an active signal to the C1 control line and data signals onto the data lines 1A. An address decoder 53 in the address decoder logic 25 compares signals on a certain number of the most-significant bit address lines with signals from address switches 54 to determine whether a specific address is within the range of addresses which designate locations in the memory module 20. When the decoder receives such an address, it enables an AND gate 55. Also, the address signals from the receiver and driver logic 24 are applied to the address multiplexer and memory register 23.

After a delay, the master unit transmits the MSYN signal. Both the MSYN signal and C1 signal energize an AND gate 56 in the receiver and driver logic 24, so an inverter 57 disables an AND gate 60. This prevents the AND gate 51 from transmitting any signals onto the data lines 1A. In addition, the MSYN signal energizes the previously enabled AND gate 55 which transmits a bus request (BREQ) signal.

An inverter 61 disables an OR gate 62 in response to the BREQ signal and thereby removes an overriding resetting signal from a latch 63 which transmits an MEM SSYNC signal. The MEM SSYNC signal serves as the SSYN signal transmitted onto the control lines 1C. The second input to the OR gate 62 is a power clearing (PWF CLR) signal which is normally inactive. The BREQ signal also shifts the output from a gated latch 64 in the synchronization and timing logic 21 (FIG. 3B) to an active state. In a gated latch such as the gated latch 64, an input signal to a D input is immediately reflected at the output so long as a latching signal to the L input is inactive. When the L input becomes active, the output signal is latched at the state which existed at the latching signal transition; subsequent changes in the input signal do not affect the output signals. When the AND gate 55 (FIG. 3A) transmits the BREQ signal, a latching signal (REQ LATCH) from an OR gate 65 is inactive so the gated latch 64 issues a BREQ(B) signal.

The BREQ(B) signal energizes an AND gate 66, normally enabled by an inverter 67 while a DONE signal transmitted by the DONE latch 70, a delay circuit 71, and an OR gate 72 is inactive. Thus, as soon as the BREQ(B) signal becomes active, AND gate 66 and OR gate 65 transmit the REQ LATCH signal to latch the gated latch 64 and another gated latch 73 which responds during refreshing cycles as described later. Also, the REQ LATCH signal energizes another AND gate 74 which provides another input to the OR gate 65 to keep the REQ LATCH signal active until the DONE signal appears.

When the OR gate 65 (FIG. 3B) is not active for a time exceeding the interval determined by a delay element 75, an inverter 76 enables AND gates 77 and 80. The REQ LATCH signal energizes the AND gate 74 for the interval determined by the delay element 75. During a transfer over BUS I, inverters 81 and 82 from the outputs of the gated latches 73 and 64 respectively, provide two enabling inputs to an AND gate 83. The third input comes from a termination cycle (BCY) flip-flop 84 which is normally reset. So these signals disable the AND gate 83 during a transfer to or from BUS I. An inverter 85, connected to the output of the AND gate 83, enables the AND gate 80 so that AND gate 80 produces a latching pulse (i.e., a REQ LATCH PUL pulse) when the OR gate 65 begins transmitting the REQ LATCH signal. After the interval determined by the delay circuit 75 elapses, the inverter 76 disables both the AND gates 77 and 80.

While the REQ LATCH PUL pulse from the AND gate 80 is active, it enables a set of AND gates including an AND gate 85. The AND gate 85, which is enabled whenever the BREQ(B) signal from the gated latch 64 is active, transmits an address enabling signal. It is coupled to the address multiplexer and memory address register 23 (FIG. 3A) to enable AND gates corresponding to an AND gate 86 in each address line to couple the address on the wires 32 from the receiver and driver logic 24 through an OR gate 87 to an address decoder 88 in the high speed memory module 20. Once the address signals are in the address decoder 88, the identified location in a data storage unit 90 is selected and enabled to receive or transmit data in response to signals from a control unit 91. The REQ LATCH PUL pulse energizes an AND gate 92, but the signal from the gated latch 73 (FIG. 3B) disables it.

At the end of the interval when the output from the AND gate 80 (FIG. 3B) in the synchronization and timing logic 21 terminates, an inverter 93 (FIG. 3A) in the address multiplexer and memory address register 23 enables another AND gate 94 which receives, as a feedback signal, the output from the OR gate 87 to thereby latch the address into the address decoder 88. At this time the output from the AND gate 77 (FIG. 3B) also terminates and an inverter 95 clocks a busy (BSY) flip-flop 96 to a set condition.

When the BSY flip-flop 96 sets, it enables the transmision of several timing control signals. Initially, delay circuits 100, 101 and 102 disable, respectively, AND gates 103, 104 and 105. Thus, an inverter 106 connected to the output of the AND gate 104 enables an AND gate 107 to transmit a pre-charging control (PRECH) signal as soon as the BSY flip-flop 96 (FIG. 3B) sets. This also initiates a charging function in the row identified by the address decoder 88 (FIG. 3A) in certain types of memories. The output of the inverter 106 also normally enables AND gate 110 so it responds to an active signal from the BSY flip-flop 96 by resetting a data latch 111 in the memory refresh logic 22 through an OR gate 112 (FIG. 3A).

After a time delay, determined by the delay element 100 (FIG. 3B), the AND gate 103 and an AND gate 113 transmit an enabling signal (CEN) to the control 91 (FIG. 3A) in the module 20 so that the module 20, and specifically the storage unit 90, can respond to the address and a subsequent writing (WR PUL) pulse. When the delay element 101 (FIG. 3B) completes its interval, which exceeds the interval the delay element 100 defines, the AND gate 104 becomes active and the inverter 106 disables the AND gate 107 thereby terminating the PRECH signal. The AND gate 110 is also disabled so the resetting signal to the data latch 111 (FIG. 3A) is removed.

Figure 3B:
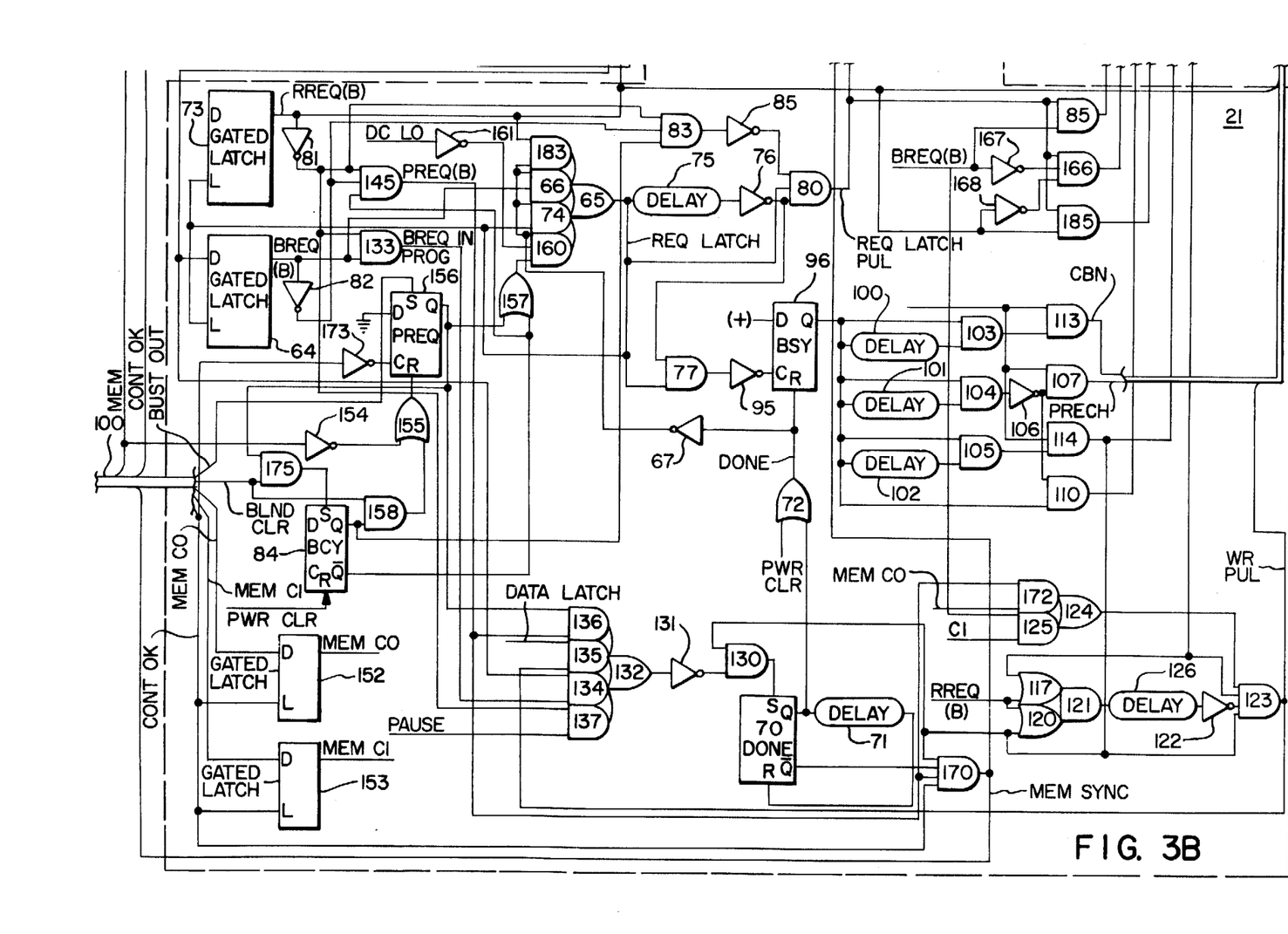

Next, the delay element 102 completes its interval to thereby energize the AND gate 105. An AND gate 114 then transmits an access ready latching (ACC RDY) signal. This signal performs several functions.

The ACC RDY signal passes through an AND gate 115 (FIG. 3A) in the synchronization and timing logic 21 during a writing operation, when the C1 signal is active, and an OR gate 116 to set the data latch 111. Now an OR gate 117 (FIG. 3B) is energized while the ACC RDY signal energizes an OR gate 120. This activates an AND gate 121 and begins a timing interval. Until that interval is completed, an inverter 122 enables an AND gate 123 which transmits the WR PUL pulse to the control 91 (FIG. 3A) in the module 20 to effect the writing operation. The other enabling inputs to the AND gate 123 are the ACC RDY signal from the AND gate 114, the DATA LATCH signal from the flip-flop 111 (FIG. 3A) and a signal from OR gate 124 (FIG. 3B), energized by an AND gate 125 in response to the active C1 signal from the receiver and driver logic circuit 24 and the BREQ(B) signal from the gated latch 64. Thus, when the data latch 111 (FIG. 3A) sets, the AND gate 123 (FIG. 3B) begins transmitting the WR PUL pulse and continues to transmit it until a delay element 126 couples the active output signal from the AND gate 121 to the inverter 122, whereupon the inverter 122 disables the AND gate 123 and terminates the WR PUL pulse.

When the ACC RDY signal energizes the AND gate 115 (FIG. 3A), an OR gate 127 in the synchronization and timing logic 21 sets the MEM SSYNC flip-flop 63. When thus set, the MEM SSYNC signal passes onto the control lines 1C as the SSYN signal. As previously indicated, the MEM SSYNC signal cannot energize the AND gate 60 which the inverter 57 disables.

When the master unit receives the SSYN signal, it terminates the MSYN signal. Then the AND gate 55 in the address decoder logic 25 is disabled so the BREQ signal terminates, the inverter 61 energizes the OR gate 62 and resets the MEM SSYNC flip-flop 63.

The DONE flip-flop 70 (FIG. 3B) is set by an AND gate 130 on the trailing edge of the WR PUL pulse from the AND gate 123. Prior to that time an inverter 131 disables the AND gate 130 because an OR gate 132 is energized. When a data transfer from BUS I begins, the BREQ signal from the AND gate 55 (FIG. 3A) in the address decoder logic 25 and a signal indicating that such a request is being processed, from an AND gate 133 (FIG. 3B), energize and AND gate 134 which provides one input to the OR gate 132. Thus, the DONE flip-flop 70 remains reset. Before the BREQ signal from the AND gate 55 (FIG. 3A) terminates, the data latch 111 in the refresh logic 22 and the WR PUL pulse from the AND gate 123 (FIG. 3B) become active, so an AND gate 135 energizes the OR gate 132. Two other AND gates 136 and 137, which provide inputs to the OR gate 132, are not active. When the BREQ signal terminates, the AND gate 134 is de-energized. However, the AND gate 135 is not de-energized until the WR PUL pulse terminates. When all four input signals to the OR gate 132 are inactive (i.e., on the trailing edge of the WR PUL pulse) the inverter 131 enables the AND gate 130 to pass the ACC RDY signal and set the flip-flop 70 for an interval determined by the delay element 71. The leading edge of the pulse the OR gate 72 receives from the flip-flop 70 initiates the DONE pulse. The delay element 71 resets the DONE flip-flop 70. Before the flip-flop 70 can be reset, the leading edge of the DONE pulse resets the BSY flip-flop 96 and terminates the CEN and ACC RDY signals. By terminating the ACC RDY signal on the leading edge of the DONE pulse, the AND gate 130 is de-energized so the delay element 71 can reset the flip-flop 70.

In response to the DONE pulse, the inverter 67 also de-energizes the AND gates 66 and 74 and other AND gates connected to the input of the OR gate 65 to terminate the REQ LATCH pulse. The gated latches 64 and 73 are released and, as the BREQ signal from the AND gate 55 is normally inactive, the BREQ(B) signal from latch 64 returns to an inactive state. Data on the bi-directional data lines 1A (FIG. 3A) is thereby transferred through the receivers, represented by AND gate 50, onto the bus 30 and through the data in multiplexer 28. Within the data in multiplexer 28 an inverter 140 enables an AND gate 141 to couple a data signal through an OR gate 142 to a gated latch 143. As previously indicated, the data signal immediately appears on the bus 29. When the data latch flip-flop 111 in the memory refresh logic 22 sets, the latch 143 no longer responds to signals on the data lines 1A. The inverter 140 receives a signal from a PREQ flip-flop 145 (FIG. 3B) in the synchronization and timing logic 21 which is reset during this operation and the inactive state of a PREQ(B) signal also disables an AND gate 146 (FIG. 3A) to thereby isolate the latch 143 from the data lines 10A. When the data storage unit 90 in a high speed memory module 20 receives data on input lines 29, an address in the address decoder 88 plus the CEN signal and WR PUL pulse, it loads the data into an appropriate storage location.

B. Transfer From the Memory Module 20 To the Bus Data Lines 1A.

Now referring to a reading operation, during which data is retrieved from the high speed memory module 20 for transfer to the master unit, the master unit transfers the bus address and appropriate values of the C1 and C0 signals to the receiver and driver logic 24 (FIG. 3A). During a reading operation, the C1 signal is not active so an AND gate 56 is not energized and an inverter 57 enables the AND gate 60. When the master unit transmits the MSYN signal, the address decoder logic 25 transmits the BREQ signal as previously discussed and this signal passes through the gated latch 64 (FIG. 3B) to appear as the BREQ(B) signal which is then held in the latch 64 when the OR gate 65 transmits the REQ LATCH pulse signal. The REQ LATCH PUL pulse from the AND gate 80 becomes active and latches the address on the bus address lines 1B in bus 32 (FIG. 3A) into the address multiplexer and memory address register 23 as also previously indicated. When the REQ LATCH PUL pulse terminates, the BSY flip-flop 96 (FIG. 3B) sets. Then the AND gate 107 transmits the PRECH signal. After the AND gate 113 transmits the CEN signal, the AND gate 114 produces the ACC RDY signal. As the OR gate 124 cannot be energized during a reading operation, the AND gate 123 can not transmit the WR PUL pulse.

The ACC RDY signal, however, does set the MEM SSYNC flip-flop 63 (FIG. 3A) through an AND gate 147 enabled by an inverter 148 to transmit the MEM SSYNC signal back to the receiver and driver logic 24. As the AND gate 60 is enabled during a reading operation, the MEM SSYNC pulse loads data signals through gates like the AND gate 51 onto the data lines 1A. The interval between leading edges of the REQ LATCH PUL pulse and the MEM SSYNC pulse insures that the high speed module 20 can decode the address and retrieve the data. When the master unit terminates the MSYN signal, the BREQ signal terminates. This resets the MEM SSYNC flip-flop 63 and de-energizes the AND gate 134 (FIG. 3B). Immediately the DONE flip-flop 70 sets to produce a DONE pulse. The AND gate 135 is not energized during a reading operation.

The DONE signal resets the BSY flip-flop 96 and terminates the REQ LATCH signal from the OR gate 65. The BREQ(B) pulse from the gated latch 64 also terminates. When the BSY flip-flop 96 resets, it disables the AND gates 103, 104, 105, 113 and 114 and thereby terminates the CEN and ACC RDY signals. After the interval determined by the delay element 71, DONE the flip-flop 70 resets, terminates the DONE signal and thereby completes this operation.

C. Data Transfer From Data Lines 10A to High Speed Memory Module 20

Transfers of this type begin when the processor transmits an address onto address lines 10C (FIG. 3A), direction control signals indicating data is to be stored in the memory module 20 onto MEM C1 and MEM C0 conductors in control lines 10D (FIG. 3B) and data onto the data lines 10A (FIG. 3A). The address signals are applied to a BUS 10 address decoder 150 in th decoder logic 25 which transmits an MEM signal if the incoming address matches a range of memory addresses identified by address switches 151. As will be apparent, the address switches 54 and 151 may be the same. At the same time, gated latches 152 and 153 (FIG. 3B) in the synchronization and timing logic 21 receive the MEM C0 and MEM C1 signals, respectively. In one system the MEM signal is transferred back to the processor to indicate that a valid memory is prepared to respond to subsequent control signals. In addition, an inverter 154 receives the MEM signal and disables an OR gate 155 to enable a PREQ flip-flop 156 to be set subsequently. The second input to the OR gate 155 is from AND gate 158 which is, at this time, disabled. The processor begins the transfer with a bus starting (BUST OUT) signal pulse. This pulse immediately sets the flip-flop 156. When the PREQ flip-flop 156 sets, the resulting PREQ signal energizes an OR gate 157 and an AND gate 160 which the inverter 67 and an inverter 161 enable. The inverter 161 responds to a DC LO signal which indicates, when active, that dc voltage associated with BUS 10 is less than an acceptable value. Such a signal disables any further transfer operations. The AND gate 160 energizes the OR gate 65. The REQ LATCH signals then feed back through the AND gate 74 and also energize the AND gates 77 and 80 to transmit the REQ LATCH PUL pulse.

While the MEM SYNC pulse is active, it serves as one input to an AND gate 162 (FIG. 3A) in the synchronization and timing logic 21, but during a writing operation, an inverter 163 responds to the MEM C1 signal, which is active, and disables the AND gate 162. Thus, a flip-flop 164 can not be set by an OR gate 165. Also, the AND gate 92 is disabled. The REQ LATCH PUL pulse does energize and AND gate 166 which inverters 167 and 168 enable. These inverters receive, respectively, the inactive output signals from the gated latches 64 and 73. Thus, the AND gate 166 enables AND gates like AND gate 169 (FIG. 3A) in the address multiplexer and memory address register 23 to pass the address signals on address lines 10C to the address decoder 88 in the memory module 20.

The trailing edge of the REQ LATCH PUL sets the BSY flip-flop 96 (FIG. 3B) and enables the previously described sequence of operations concerning the CEN, PRECH and ACC RDY signals to proceed. Further, the data latch 111 (FIG. 3A) resets and "unlatches" the latch 143 in the data-in multiplexer 28. Shortly after the BSY flip-flop 96 sets, the processor transmits a CONT OK signal or a BEND CLR signal. Normally the former signal is transmitted. As one function, it latches the gated latches 152 and 153.

When the ACC RDY signal becomes active, it energizes an AND gate 170 which is enabled while the DONE flip-flop 70 is reset and in response to an active signal from the AND gate 145 after the CONT OK signal becomes active. The AND gate 145 is in the priority net to be described. It is energized whenever the gated latches 64 and 73 are not active and the BCY flip-flop 84 is reset. The resulting MEM SYNC signal from the AND gate 170 energizes an AND gate 171 (FIG. 3A) which is enabled by the MEM C1 signal from the gated latch 153. The AND gate 171 then sets the data latch 111 through the OR gate 116.

During this operation, the PREQ(B) signal from the AND gate 145 (FIG. 3B) enables the AND gate 146 (FIG. 3A) and disables the AND gate 141. Thus, when the data latch 111 sets, it loads a data signal from the data lines 10A into the gated latch 143. An AND gate 172 (FIG. 3B), enabled by the output from the gated latch 153, is also energized by the PREQ(B) signal to enable the AND gate 123. Thus, setting the data latch 111 also initiates the WR PUL pulse.

The MEM SYNC signal from the AND gate 170 is also transmitted back to the central processor unit over the control lines 10D to indicate that the writing operation is being completed. This occurs at the beginning of the write pulse. After this occurs, the processor stops transmitting the address signals so the MEM signal from the address decoder 150 terminates. Also, the CONT OK signal is terminated. An inverter 173 clocks the PREQ flip-flop 156 to a reset condition and thereby removes an enabling signal from the AND gate 160 so that only the AND gate 74 keeps the OR gate 65 energized. When the CONT OK signal terminates, it stops the MEM SYNC signal from the AND gate 170. When the WR PUL pulse ends, as previously described, the AND gate 135 is de-energized, so the AND gate 130 sets the DONE flip-flip 70.

When the DONE flip-flop 70 sets, the BSY flip-flop 96 resets, and disables the AND gates 103, 104 and 105, the CEN signal from the AND gate 113 and the ACC RDY signal from the AND gate 114. The DONE pulse also terminates the REQ LATCH signal. Then the overriding setting signal to the DONE flip-flop 70 is removed so the DONE flip-flop 70 can reset after a delay. As previously indicated, this terminates the operation.

As previously noted, the arithmetic and logic unit 9 in FIG. 1 may transmit either a CONT OK signal or a BEND CLR signal. It then is possible to place the next expected address onto the address lines 10C. If, in fact, that expected address is the actual address to be involved in the next transfer, the CONT OK signal is transmitted. Otherwise, the BEND CLR signal energizes an AND gate 175 (FIG. 3B), enabled by the PREQ flip-flop 156. This sets the BCY flip-flop 84 and energizes the AND gate 158 and the AND gate 83. By energizing the AND gate 83, the BCY flip-flop 84 disables the AND gate 80 so that the AND gate 166 can not transmit its address selection signal to the multiplexer 23 (FIG. 3A). The AND gate 77 (FIG. 3B) is not disabled, however, so the BSY flip-flop 96 sets and resets as previously indicated. When the AND gate 158 is energized, it immediately resets the PREQ flip-flop 156 through the OR gate 155 and further enables the DONE flip-flop 70 to be reset to thereby terminate any further procedures.

D. Data Transfers From the High Speed Memory Module 20 to Data Lines 10B

During a reading operation to the arithmetic and logic unit 9 in FIG. 1, the address lines 10C (FIG. 3A) receive the address signals and the address decoder transmits the MEM signal as previously described. The MEM C1 signal from the gated latch 153 (FIG. 3B) is inactive. The subsequent transmission of the BUST OUT signal over the control lines 10D sets the PREQ flip-flop 156 and, with the PREQ(B) signal, disables the DONE circuit by energizing the AND gate 136. Also, the PREQ flip-flop 156 initiates the REQ LATCH signal and the REQ LATCH pulse to latch an address into the register 23 (FIG. 3A), and begin retrieving data. Next the BSY flip-flop 96 (FIG. 3B) sets and the AND gate 107 begins transmitting the PRECH signal. After the CEN signal enables the memory module 20 (FIG. 3A), the ACC RDY signal sets the data latch 111. The data appears on the bus 31 and is placed onto the data lines 10B as shown in FIG. 2 either directly or indirectly through gates, such as an AND gate 176, in a buffer 70 enabled by the PREQ signal from the flip-flop 156 (FIG. 3B).

When the arithmetic and logic unit 9 in FIG. 1 transmits the CONT OK signal, the gated latches 152 and 153 (FIG. 3B) store the MEM C0 and MEM C1 signals. The AND gate 170 is thereby enabled to transmit, in response to the ACC RDY signal, the MEM SYNC signal back to the unit 9. This enables the unit 9 to receive the data on the data lines 10B and terminate the CONT OK signal. Then the inverter 173 (FIG. 3B) resets the PREQ flip-flop 156, and the MEM SYNC signal ends. The address signals on the address lines 10C are terminated so the address decoder 150 disables the MEM signal.

When the PREQ flip-flop 156 resets, the REQ LATCH signal can be subsequently terminated by the inverter 67 in response to the DONE pulse. When the PREQ flip-flop 156 resets, the DONE flip-flop 70 sets immediately and resets the BSY flip-flop 96. This terminates the output signal from the AND gates 103, 104, and 105, the CEN signal from the AND gate 113 and the ACC RDY signal from the AND gate 114. Then the DONE flip-flop 70 resets and the reading operation is completed.

There are two types of reading operations which can occur in response to signals over BUS I or BUS 10. The foregoing describes a normal type of operation in which the C0 or MEM C0 signal is inactive. In another type, it is known that a writing operation will immediately follow the reading operation to the same location. In these cases, it is beneficial to prevent the DONE pulse after the reading operation. During a reading operation over the BUS 10, the AND gate 162 (FIG. 3A) is enabled by the CONT OK signal, the inverter 163 and active level of the MEM C0 signal, so the leading edge of the MEM SYNC signal sets the flip-flop 164. During a transfer over the BUS I, an AND gate 177 is energized by the active C0 signal, the inverter 148 which receives the inactive C1 signal and the output from the AND gate 133 to set the pause flip-flop 164. The PAUSE signal is then applied to the AND gate 137 (FIG. 3B) together with the output of the inverter 81 to disable the DONE signal. When the subsequent writing operation begins, the gates 162 or 177 are disabled. An OR gate 178 resets the flip-flop 164 when the data latch 111 resets. The OR gate 178 also receives the PWR CLR signal.

E. Refreshing Operations

Some memory modules shown in FIG. 3A have capacitive characteristics and must be recharged periodically. The memory refresh logic 22 provides this function. A clock 180 periodically sets the REF REQ flip-flop 181 and advances a counter 182. Within the synchronization and timing logic 21, the REF REQ signal enables the gated latch 73 (FIG. 3B) to produce an RREQ(B) signal which energizes an AND gate 183. The OR gate 65 then transmits the REQ LATCH signal. The RREQ(B) and REQ LATCH signals also reset the flip-flop 181 (FIG. 3A) through the AND gate 92. The counter 182 transmits address signals to the address multiplexer and memory address register 23 including the AND gate 184 enabled by an AND gate 185 (FIG. 3B) in response to the REQ LATCH and RREQ(B) signals.

When the REQ LATCH pulse terminates, as determined by the delay element 75, the BSY flip-flop 96 sets and the AND gate 107 begins transmitting the PRECH signal on the control 94. This enables the designated location to be refreshed as the RREQ(B) signal also is applied to the control 91 in the memory module 20. Then the delay element 100 energizes the AND gate 103 so the AND gate 113 enables the module by means of the CEN signal. The refreshing operation continues until the AND gate 104 terminates the PRECH signal. Next, the delay element 102 energizes the AND gate 105 and the AND gate 114 transmits the ACC RDY signal. As none of the AND gates 134 through 137 are energized during a refreshing cycle, the inverter 131 enables the AND gate 130 to immediately set the DONE flip-flop 70 in response to the receipt of the ACC RDY signal. In turn, the DONE signal immediately resets the REQ LATCH signal thereby terminating the RREQ(B) signal from the gated latch 73. In addition, the DONE resets the BSY flip-flop 96 and terminates the outputs of the AND gates 103, 104 and 105 and the CEN and ACC RDY signals from the AND gates 113 and 114. After the interval determined by the delay element 71, the DONE signal 70 resets and terminates the operation.

F. Priority Determination

All the previous discussion assumes that the sources of the five described transfer operations occur in a mutually exclusive fashion. In any system, there is no way to guarantee such mutual exclusivity. Thus, the synchronization and timing logic 21 additionally contains some priority circuitry. FIG. 3 discloses specific circuits for establishing a priority in which a refreshing request operation has the highest priority and a request for a transfer over the bus 10 has the lowest priority. Thus, the AND gate 145 (FIG. 3B) is always active so long as the output from the gated latch 73 and the gated latch 64 are low and the BCY flip-flop 84 is reset. If either of these latches 73 or 64 transmits an active signal, the AND gate 145 is disabled. Assume the gated latch 73 transmits an RREQ(B) signal. If an MSYN signal is received in the receiver and decoder logic 24 (FIG. 3A), a resulting output signal from the gated latch 64 (FIG. 3B), before the REQ LATCH signal is received, cannot energize the AND gate 133 because the inverter 81 disables the AND gate 133. If both addresses from the counter 182 and the bus 32 are applied simultaneously, the output from the AND gate 185 will disable the AND gate 86 (FIG. 3A) through an inverter 186 so that only the address signals from the counter 182 are coupled to the address decoder 88.

Thus, FIG. 3 discloses a particular embodiment of the circuitry shown in FIG. 2. It will be apparent from this disclosure that the circuitry in each of the blocks is conventional and apparent in view of the discussion of FIG. 2. This is true because high speed memory modules are commercially available components with predetermined characteristics concerning the timing of address, data and control signals. Other elements in the system define the timing and nature of the control signals. The synchronization and timing logic 21 merely serves as an interface between the memory module on the one hand, and the unit 9 in FIG. 1 and BUS I, on the other hand. Given the characteristics of the processor and memory module, the circuitry in each block becomes a straightforward implementation. Furthermore, it will also be apparent that the circuitry in each block in FIG. 2 may be altered without departing from the true spirit and scope of this invention. Therefore, it is the object of the appended claims to cover all such variations and modifications as come within the true spirit and scope of this invention.

What we claim as new and desire to secure by Letters Patent of the United States is:

1. A random access memory unit for connection to a digital computer system including a central processor unit and a bidirectional bus with data, control and address lines, the bus having a characteristic finite propogation delay time, said memory unit comprising:
 A. addressable storage means, said memory unit storing and retrieving data from said addressable storage means during memory cycle operations each having a duration which is less than the characteristic propogation delay time for the bus,
 B. a first port with data, control and address lines for connection to the corresponding lines in the bus,
 C. a second port with data, control and address lines for direct connection to corresponding lines in the central processor unit,
 D. an address multiplexer responsive to signals from said address lines at said first and second ports for passing a selected address therethrough to identify a unique location in said storage means, E. data connection means for coupling data to and from said storage means and to and from data lines at said first and second ports, F. control means responsive to control and address signals on the control and address lines from said first and second ports for controlling said address multiplexer.

2. A memory unit as recited in claim 1 wherein said data connection means includes a data-in multiplexer, said data lines from said first and second ports being connected as inputs to said data-in multiplexer, said data-in multiplexer being responsive to signals from said control means for transferring one of the inputs to said storage means and receiver and driver logic means for coupling said data lines from said first port to said data-in multiplexer and said address lines from said first port to said address multiplexer.

3. A memory as recited in claim 2 wherein said storage means is divided into sections and further includes address decoder logic, said address decoder logic receiving address information on said address lines from said first port and from said receiver and driver logic means, said address decoder logic responding to input signals thereto for providing output signals coupled to said address multiplexer to provide a preliminary indication of a section in said memory to be subsequently accessed.

4. A memory as recited in claim 1 in which said memory is volatile and further including memory refresh logic, said memory refresh logic periodically issuing refresh signals to said address multiplexer, said refresh signals designating a section of said memory to be refreshed prior to access in response to signals at said first or second ports.

* * * * *